(12) United States Patent
Huang

(10) Patent No.: US 9,786,948 B2
(45) Date of Patent: Oct. 10, 2017

(54) THIN FILM LITHIUM-ION BATTERY

(71) Applicant: QingHong Technology Co., Ltd., New Taipei (TW)

(72) Inventor: Chun-Lung Huang, Taipei (TW)

(73) Assignee: Ying-Tsun Lin, Yilan County (TW)

(*) Notice: Subject to any disclaimer, the term of this patent is extended or adjusted under 35 U.S.C. 154(b) by 127 days.

(21) Appl. No.: 14/309,876

(22) Filed: Jun. 19, 2014

(65) Prior Publication Data
US 2014/0377624 A1 Dec. 25, 2014

Related U.S. Application Data

(60) Provisional application No. 61/837,195, filed on Jun. 20, 2013.

(51) Int. Cl.
*H01M 2/26* (2006.01)
*H01M 10/0525* (2010.01)
*H01M 10/0583* (2010.01)
*H01M 10/04* (2006.01)
*H01M 6/10* (2006.01)
*H01M 2/08* (2006.01)

(52) U.S. Cl.
CPC ......... *H01M 10/0525* (2013.01); *H01M 2/26* (2013.01); *H01M 10/0454* (2013.01); *H01M 10/0486* (2013.01); *H01M 10/0583* (2013.01); *H01M 2/08* (2013.01); *H01M 6/103* (2013.01); *H01M 10/0436* (2013.01); *Y02E 60/122* (2013.01)

(58) Field of Classification Search
CPC ......... H01M 10/0525; H01M 10/0486; H01M 10/0583; H01M 10/0436; H01M 2/26; H01M 2/08; Y02E 60/122
See application file for complete search history.

(56) References Cited

U.S. PATENT DOCUMENTS

| | | | |
|---|---|---|---|
| 5,744,261 A | 4/1998 | Muffoletto | |
| 6,004,692 A | 12/1999 | Muffoletto | |
| 2006/0001137 A1* | 1/2006 | Hundt | H01L 23/49575 257/678 |
| 2006/0216589 A1* | 9/2006 | Krasnov | H01M 2/0404 429/175 |
| 2007/0231684 A1 | 10/2007 | Takano | |

* cited by examiner

Primary Examiner — Raymond Alejandro
(74) Attorney, Agent, or Firm — Winston Hsu

(57) ABSTRACT

A thin film lithium-ion battery unit includes a positive current collecting substrate, a positive electrode active material layer on an inner surface of the positive current collecting substrate, a negative current collecting substrate, a negative electrode active material layer on an inner surface of the negative current collecting substrate, a separator between the positive electrode active material layer and the negative electrode active material layer, and electrolyte retained at least in the separator. The positive electrode active material layer, the separator and the negative electrode active material layer constitute a laminated electric core. An outer conductive frame is spaced apart from the positive current collecting substrate and encompasses the positive current collecting substrate.

8 Claims, 19 Drawing Sheets

THIN FILM LITHIUM-ION BATTERY

CROSS REFERENCE TO RELATED APPLICATIONS

This application claims the benefit of U.S. provisional application No. 61/837,195, filed Jun. 20, 2013, which is included in its entirety herein by reference.

BACKGROUND OF THE INVENTION

1. Field of the Invention

The present invention relates generally to batteries. More particularly, the present invention relates to a thin film lithium-ion battery.

2. Description of the Prior Art

Lithium-ion secondary batteries or lithium-ion batteries have been used as power supplies for personal computers, portable devices such as cell phones, cameras, electric tools, and the like. In secondary batteries, the electron producing and consuming reactions are for the most part reversible, and therefore such a battery can be cycled between a charged and discharged state electrochemically.

When the rechargeable battery is charged, ions formed of the cathode material pass from the cathode through the electrolyte to the anode, and when the battery is discharged these ions travel back from the anode through the electrolyte to the cathode. For example, in batteries having a cathode comprising lithium, such as a $LiCoO_2$ or $LiMnO_2$ cathode, lithium species originating from the lithium-containing cathode travel from the cathode to the anode and vice versa during the charging and discharging cycles, respectively.

FIG. 1 illustrates a conventional structure of a lithium-ion battery. As shown in FIG. 1, the lithium-ion battery 1 includes an electrochemical cell comprising an anode active material layer 11 disposed on one side surface of a separator 10, a cathode active material layer 21 disposed on the other side surface of the separator 10, an anode current collector 12, and a cathode current collector 22. The separator 10 may be made of polymers such as polyimide (PI), polyprolene (PP), polyethylene (PE), polyvinyl chloride (PVC) or polycarbonate (PC) having porous structure to only allow the passage of the lithium ions, while preventing internal shorting between the anode active material layer 11 and the cathode active material layer 21. To electrically connect the anode current collector 12 and the cathode current collector 22 to an external circuit or device, the lithium-ion battery 1 may further include two outwardly extended tabs 12a and 22a.

Typically, the separator 10, the anode active material layer 11 and the cathode active material layer 21 are wetted with a liquid electrolyte solution or gel electrolyte. The electrochemical cell is typically enclosed in a parallelepipedic metal case 20 such as an aluminum case in a gas-tight manner with a sealant layer 24 securely sealing a gap between the tabs 12a and 22a.

FIG. 2 illustrates another form of a lithium-ion battery known in the art. As shown in FIG. 2, the lithium-ion battery 3 is integrated with a circuit substrate 30 such as a copper clad laminate (CCL) substrate. The base dielectric of the CCL substrate may include polyimide (PI), polyethylene terephthalate (PET) or glass fiber. The circuit substrate 30 includes a separator portion 30a having therein a plurality of through holes or porous structures for the passage of lithium ions. The separator portion 30a is sandwiched by a pair of electrodes 41 and 51. A current collector 42 is disposed directly on a top surface of the electrode 41. The electrode 41 is sealed by a packaging unit 43. Likewise, a current collector 52 is disposed directly on a top surface of the electrode 51. The electrode 51 is sealed by a packaging unit 53. Both of the current collectors 42 and 52 are typically made of expensive CCL substrates. The use of CCL substrates increases manufacturing cost/complexity and battery weight.

Portable electronic devices have been progressively reduced in size and weight and improved in performance. It is therefore required to develop a rechargeable lithium-ion battery or lithium-ion secondary cell having a high energy density and a high output, which is also cost-effective. Further, after being stored or circled for certain numbers, gas may be generated in lithium-ion batteries, especially at high temperature, which will reduce life span of the lithium-ion battery. What is needed, therefore, is to provide a lithium-ion battery which has desirable life span.

SUMMARY OF THE INVENTION

One object of the present invention is to provide an improved thin film battery that is cost-effective, and has simple structure, high capacity, desirable life span and cycle performance.

Another object of the present invention is to provide a thin film battery with improved ability of gas resistance and moisture resistance.

According to one embodiment, a thin film lithium-ion battery unit includes a positive current collecting substrate, a positive electrode active material layer coated on an inner surface of the positive current collecting substrate, a negative current collecting substrate, a negative electrode active material layer coated on an inner surface of the negative current collecting substrate, a separator sandwiched between the positive electrode active material layer and the negative electrode active material layer, and electrolyte retained at least in the separator. The positive electrode active material layer, the separator and the negative electrode active material layer constitute a laminated electric core.

An outer conductive frame is provided to encompass the positive electrode active material layer with a gap formed therebetween. The outer conductive frame is substantially flush with the positive current collecting substrate. According to one embodiment of the present disclosure, the outer conductive frame may have an opening for accommodating a positive tab that juts out from an edge of the positive current collecting substrate. According to one embodiment of the present disclosure, the outer conductive frame may have a protruding negative tab. A glue layer may be provided to fill the gap.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings:

FIG. 9 and FIG. 10 illustrate another embodiment of the present invention, wherein FIG. 10 is a cross-sectional view taken along line II-II' of FIG. 9.

Figure 1:
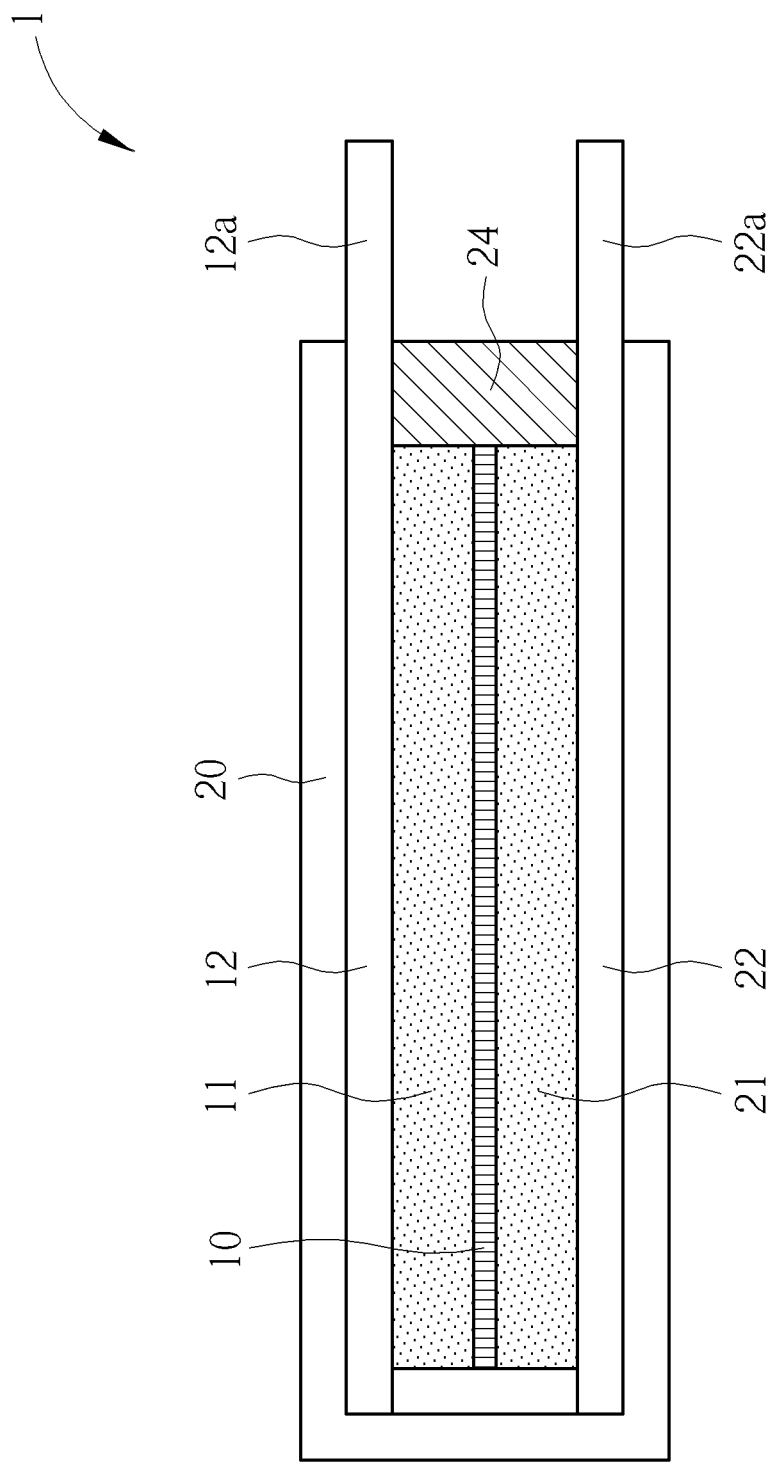
FIG. 1 illustrates a conventional structure of a lithium-ion battery.
Figure 2:
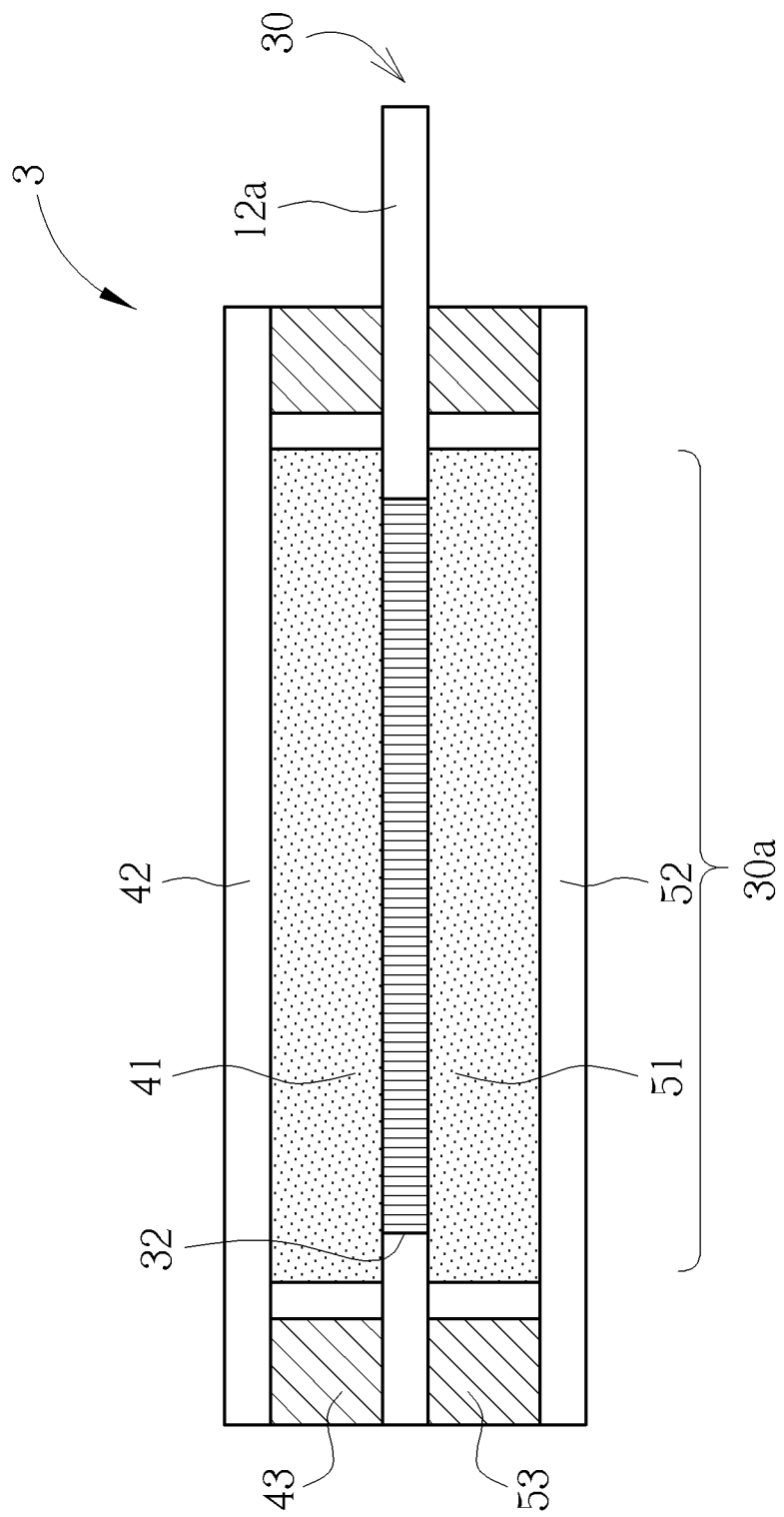
FIG. 2 illustrates another form of a lithium-ion battery known in the art.

It should be noted that all the figures are diagrammatic. Relative dimensions and proportions of parts of the drawings are exaggerated or reduced in size, for the sake of clarity and convenience. The same reference signs are generally used to refer to corresponding or similar features in modified and different embodiments.

DETAILED DESCRIPTION

In the following description, numerous specific details are given to provide a thorough understanding of the invention. It will, however, be apparent to one skilled in the art that the invention may be practiced without these specific details. Furthermore, some well-known system configurations and process steps are not disclosed in detail, as these should be well-known to those skilled in the art.

Likewise, the drawings showing embodiments of the apparatus are semi-diagrammatic and not to scale and some dimensions are exaggerated in the figures for clarity of presentation. Also, where multiple embodiments are disclosed and described as having some features in common, like or similar features will usually be described with like reference numerals for ease of illustration and description thereof.

The following sets forth a detailed description of a mode for carrying out the invention. The description is intended to be illustrative of the invention and should not be taken to be limiting. It is understood that present invention may be applicable to both primary batteries and secondary batteries, although some embodiments take the secondary battery as an example.

Figure 3:
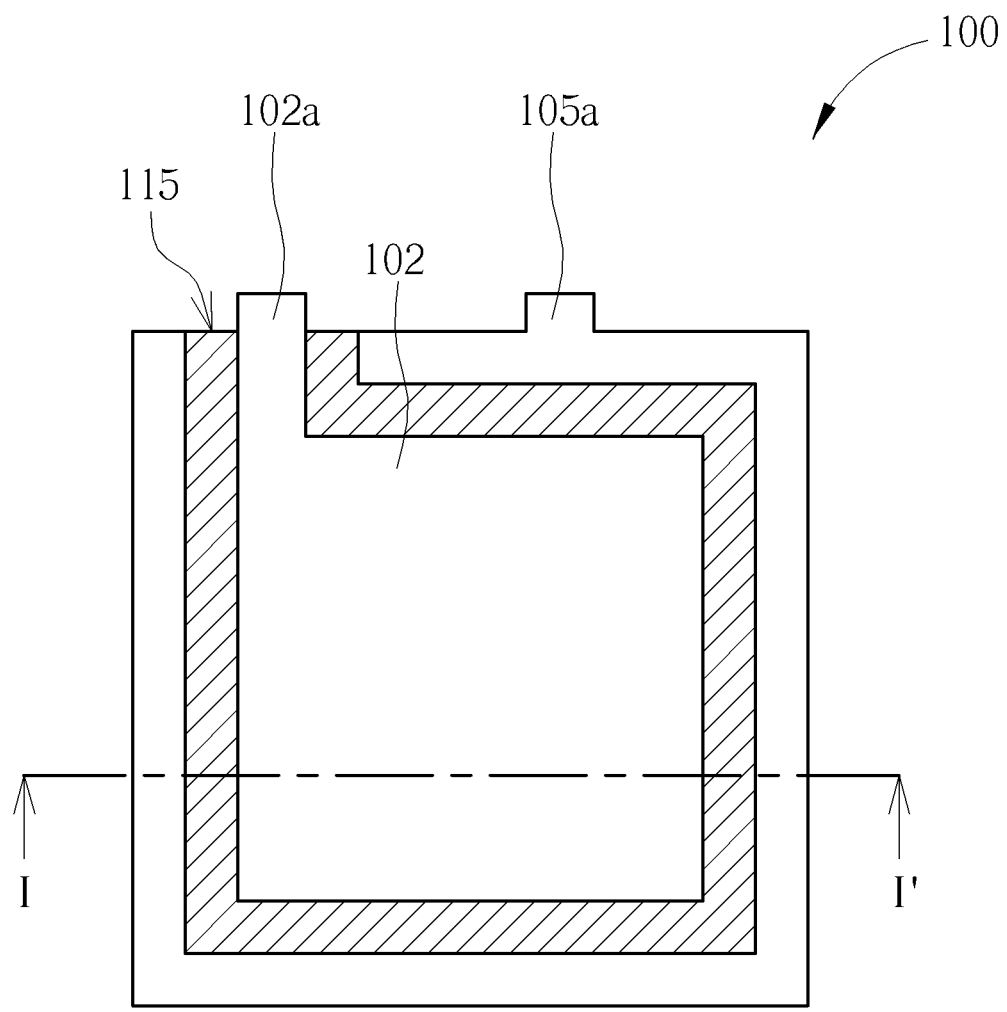
FIG. 3 is a schematic top view of an exemplary thin-film lithium-ion battery according to one embodiment of the invention.
Figure 4:
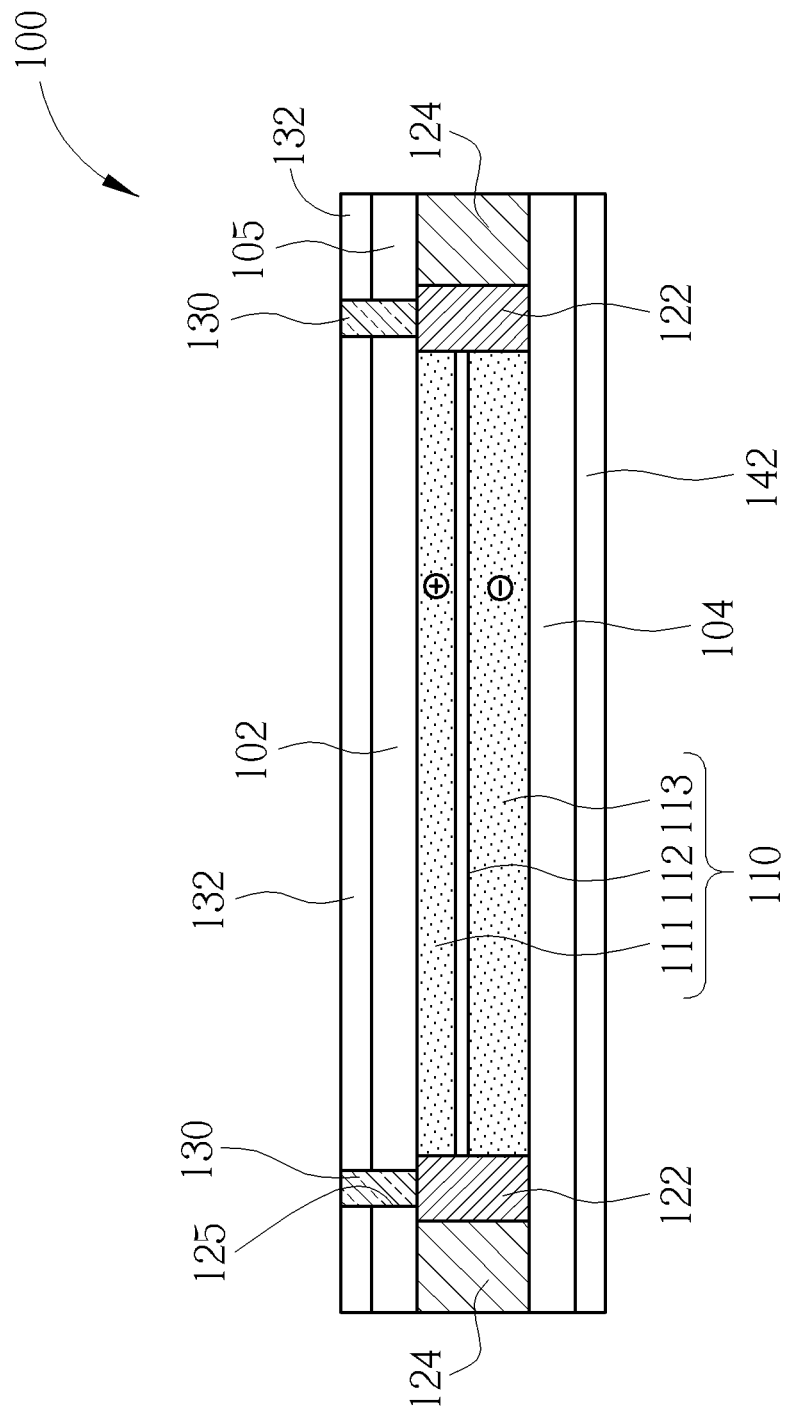
FIG. 4 is a cross-sectional diagram taken along line I-I' in FIG. 3.

Please refer to FIG. 3 and FIG. 4. FIG. 3 is a schematic top view of an exemplary thin-film lithium-ion battery according to one embodiment of the invention. FIG. 4 is a cross-sectional diagram taken along line I-I' in FIG. 3. As shown in FIG. 3 and FIG. 4, the lithium-ion battery unit 100 comprises a positive current collecting substrate 102, a positive electrode active material layer 111 coated on an inner surface of the positive current collecting substrate 102, a negative current collecting substrate 104, a negative electrode active material layer 113 coated on an inner surface of the negative current collecting substrate 104, a separator 112 sandwiched between the positive electrode active material layer 111 and the negative electrode active material layer 113, and electrolyte (not explicitly shown) retained at least in the separator 112. The positive electrode active material layer 111, the separator 112 and the negative electrode active material layer 113 constitute a laminated electric core 110. The separator 112 between the positive and negative electrodes prevents physical contact of the electrodes while enabling ionic transport.

An outer conductive frame 105, which is spaced apart from the positive current collecting substrate 102, may be provided to encompass the positive current collecting substrate 102 with a gap 125 formed therebetween. The outer conductive frame 105 is substantially flush or coplanar with the positive current collecting substrate 102. The outer conductive frame 105 and the positive current collecting substrate 102 are formed in the same horizontal level. According to one embodiment of the present disclosure, the outer conductive frame 105 is not a closed loop shaped frame and may have an opening 115 for accommodating a positive tab 102a that juts out from an edge of the positive current collecting substrate 102. According to one embodiment of the present disclosure, the outer conductive frame 105 may have a protruding negative tab 105a. A glue layer 130 may be provided to fill the gap 125. The glue layer 130 is flush with a covering insulation layer 132 that covers the outer conductive frame 105 and the positive current collecting substrate 102. On the bottom surface of the negative current collecting substrate 104, a covering insulation layer 142 may be provided. The covering insulation layers 132 and 142 may comprise polyimide (PI), polyvinyl chloride (PVC), polypropylene (PP), polyethylene (PE), polycarbonate (PC), polyurethane (PU), or polyethylene terephthalate (PET), but not limited thereto. The laminated electric core 110 may be sealed by a sealant layer 122 provided along the periphery of the laminated electric core 110 between the positive current collecting substrate 102 and the negative current collecting substrate 104. A conductor layer 124 may be provided adjacent to the sealant layer 122 by using welding, soldering, or any suitable techniques.

According to one embodiment of the present disclosure, the outer conductive frame 105 may be electrically coupled to the underlying negative current collecting substrate 104 through the conductor layer 124. However, in another embodiment, the layer 124 may be composed of non-conductive materials such as an adhesive material. It is to be understood that other approaches may be used to accomplish the electrical connection between the negative current collecting substrate 104 and the outer conductive frame 105.

Figure 5A:
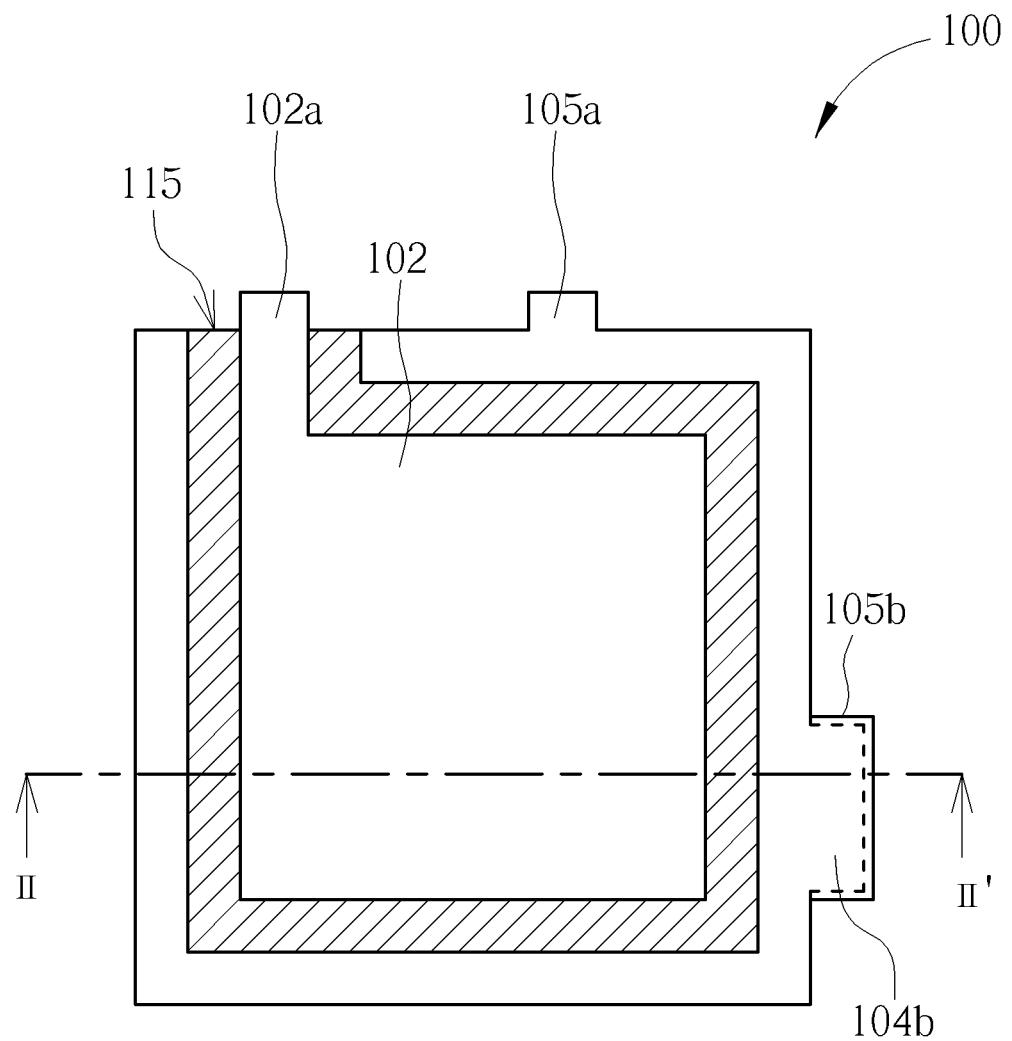
FIG. 5A and FIG. 5B show another embodiment wherein only the seal layer is used.
Figure 5B:
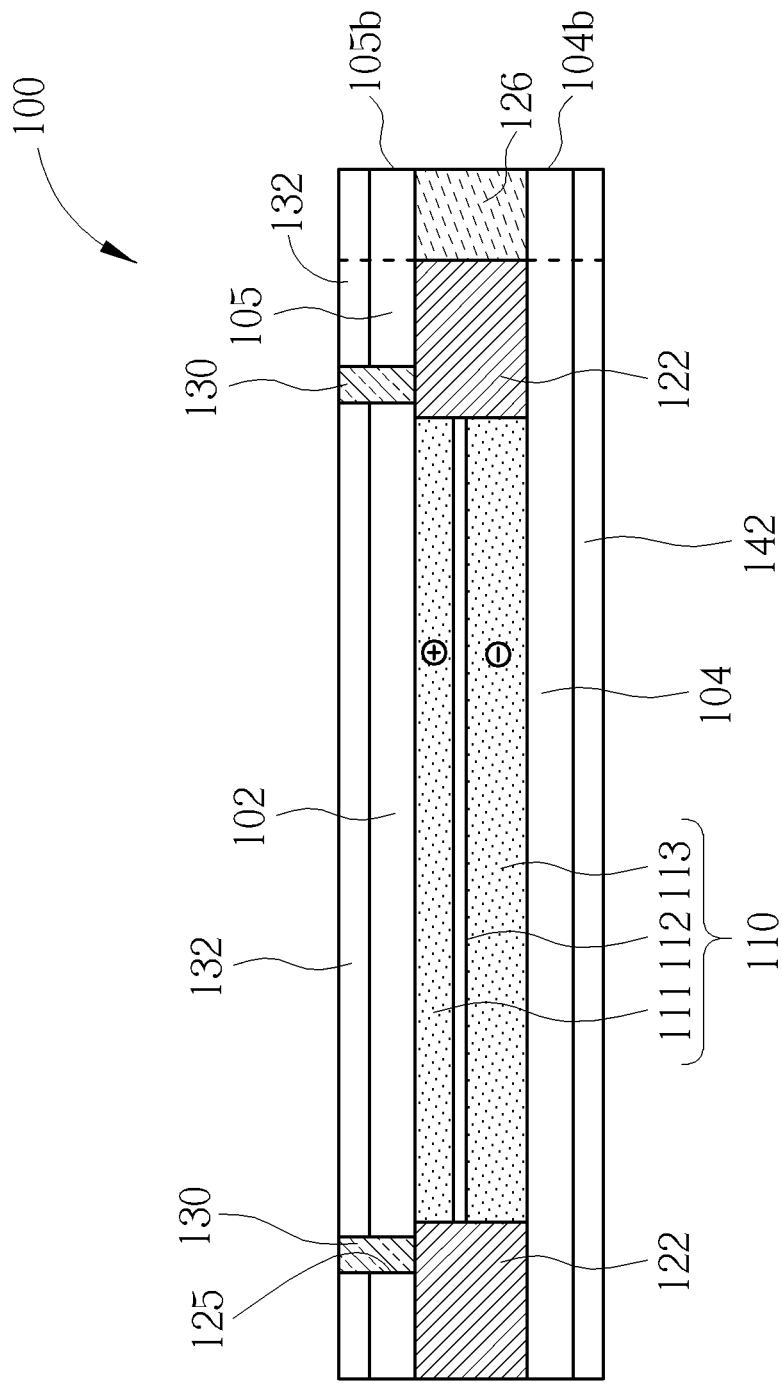

FIG. 5A and FIG. 5B show such embodiment. As shown in FIGS. 5A and 5B, the periphery of the laminated electric core 110 between the positive current collecting substrate 102 and the negative current collecting substrate 104 is sealed by using only the sealant layer 122. To electrically connect the negative current collecting substrate 104 with the outer conductive frame 105, an extension portion 105b of the outer conductive frame 105 and an extension portion 104b of the negative current collecting substrate 104 may be provided. A conductive layer 126 may be applied between the extension portion 105b and the extension portion 104b to electrically connect the negative current collecting substrate 104 with the outer conductive frame 105.

Figure 8A:
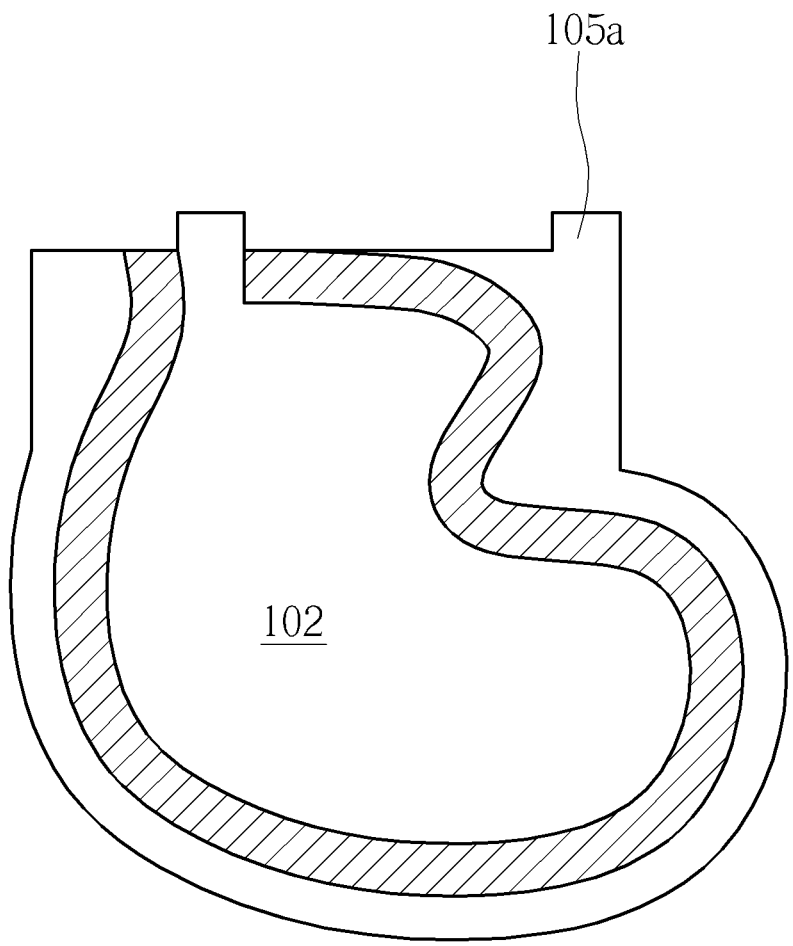
FIG. 8A and FIG. 8B show irregular outline of the battery cell.
Figure 8B:
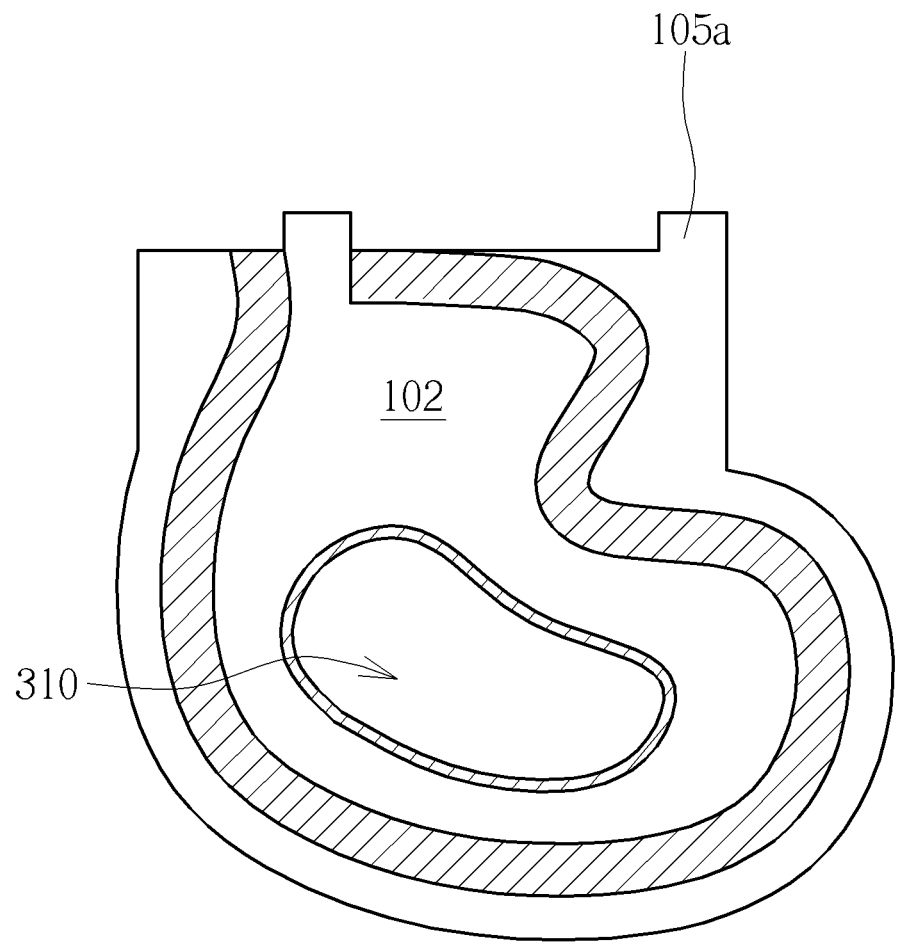

The shape of the battery cell as set forth in the figures is only for illustration purposes. It is not necessary that the outline of the battery cell has a rectangular shape as depicted in FIGS. 3 and 5A. In other embodiments, the outline of the battery cell may have an irregular shape, when viewed from the above, as shown in FIG. 8A. FIG. 8B shows a battery cell having an irregular shape and outline. In addition, a through opening 310 may be provided. The through opening 310 extends through the entire thickness of the battery cell.

Figure 9:
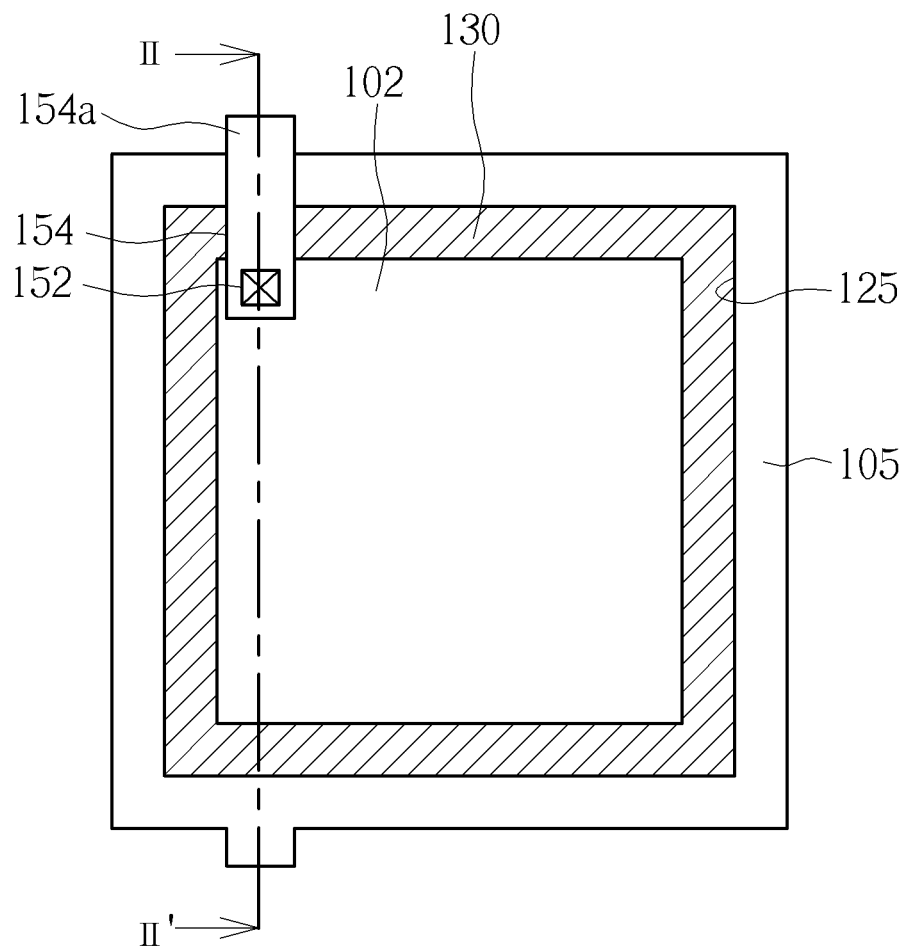
Figure 10:
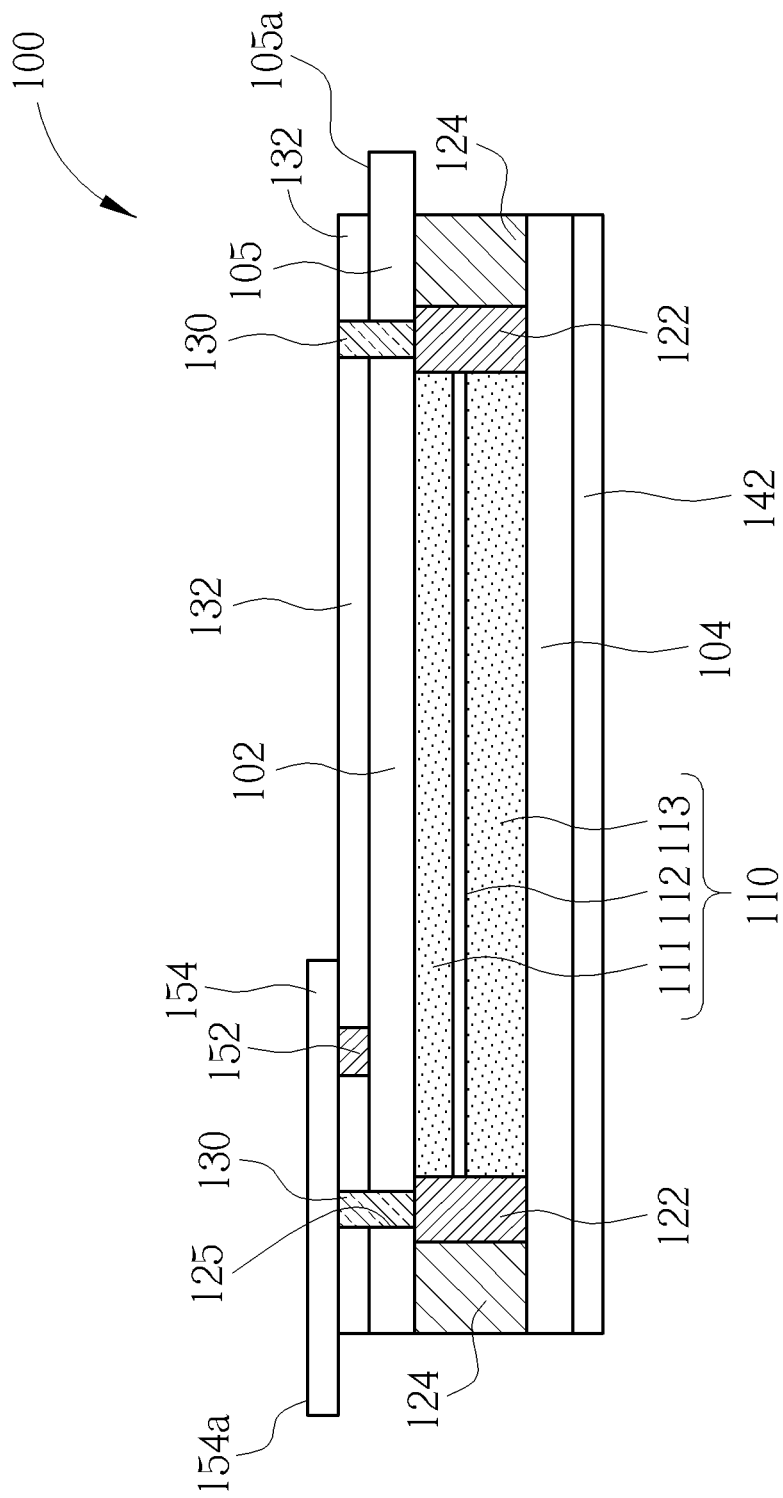

FIG. 9 and FIG. 10 illustrate another embodiment of the present invention, wherein FIG. 10 is a cross-sectional view taken along line II-II' of FIG. 9. As shown in FIG. 9 and FIG. 10, the outer conductive frame 105 is a closed loop. An interconnect layer 154 is formed on the covering insulation layer 132 and is electrically connected to the positive current collecting substrate 102 through the via plug 152. The via plug 152 may comprise conductive pastes, plated copper, solder pastes or other suitable conductive materials known in the art. The interconnect layer 154 may extend beyond the outer conductive frame 105 to form a positive connecting tab 154a. Likewise, the outer conductive frame 105 may also extend beyond the edge of the cell to form a negative connecting tab 105a. The positive connecting tab 154a and the negative connecting tab 105a form a battery terminal pair.

Figure 11:
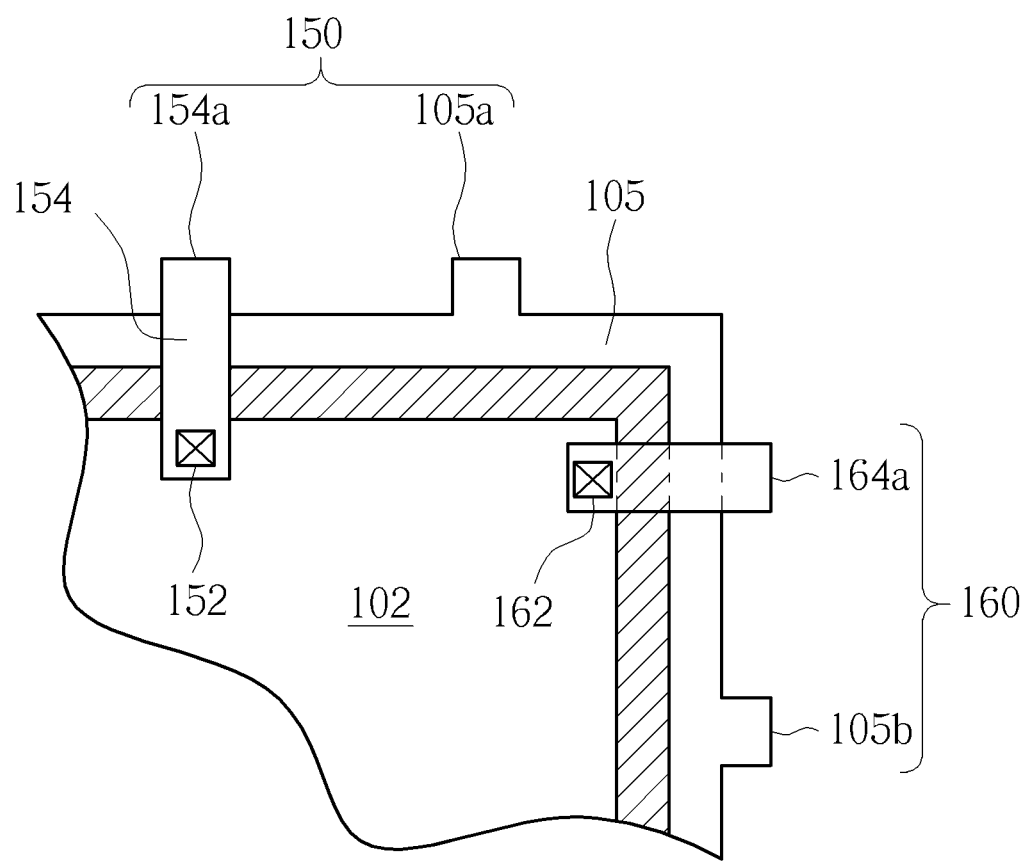
FIG. 11 shows two battery terminal pairs in one the battery cell.

It is to be understood that the number of the battery terminal pair depends upon the design requirements and one battery cell may have multiple battery terminal pairs. As shown in FIG. 11, the battery cell comprises two battery terminal pairs 150 and 160. The battery terminal pair 150 comprises positive connecting tab 154a and the negative connecting tab 105a. Likewise, as previously described, the positive connecting tab 154a of the interconnect layer 154 is formed on the covering insulation layer 132 and is electrically connected to the positive current collecting substrate 102 through the via plug 152. The battery terminal pair 160 comprises positive connecting tab 164a and the negative connecting tab 105b. The positive connecting tab 164a of the interconnect layer 164 is formed on the covering insulation layer 132 and is electrically connected to the positive current collecting substrate 102 through the via plug 162. In addition to the interconnect layers 154 and 164, it is to be understood that other circuit patterns or circuit elements may also be formed on the covering insulation layer 132.

Figure 12A:
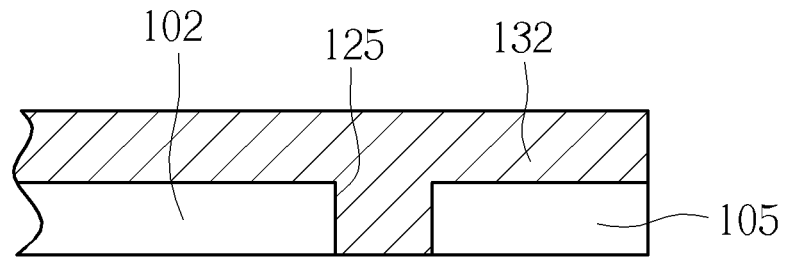
FIGS. 12A-12D show various approaches to sealing the battery cell.
Figure 12B:
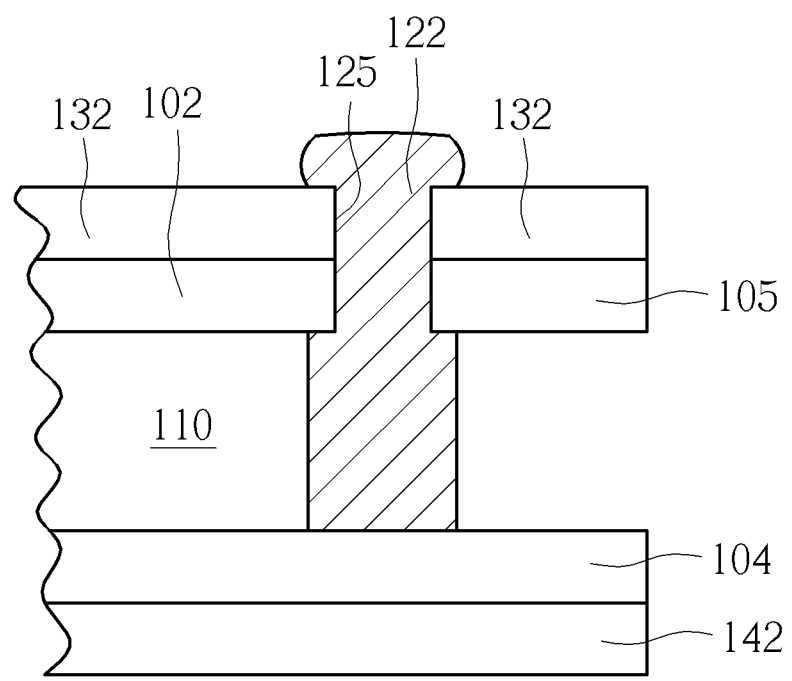
Figure 12C:
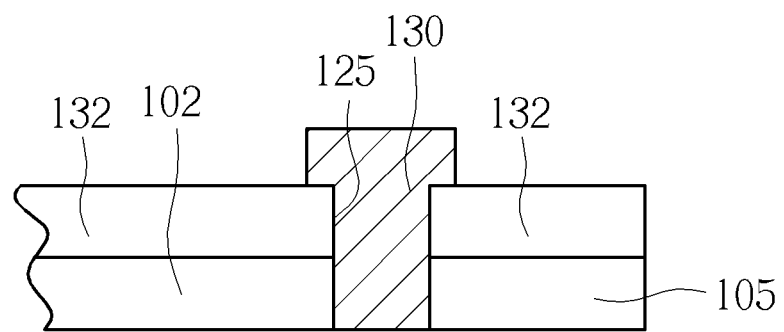
Figure 12D:
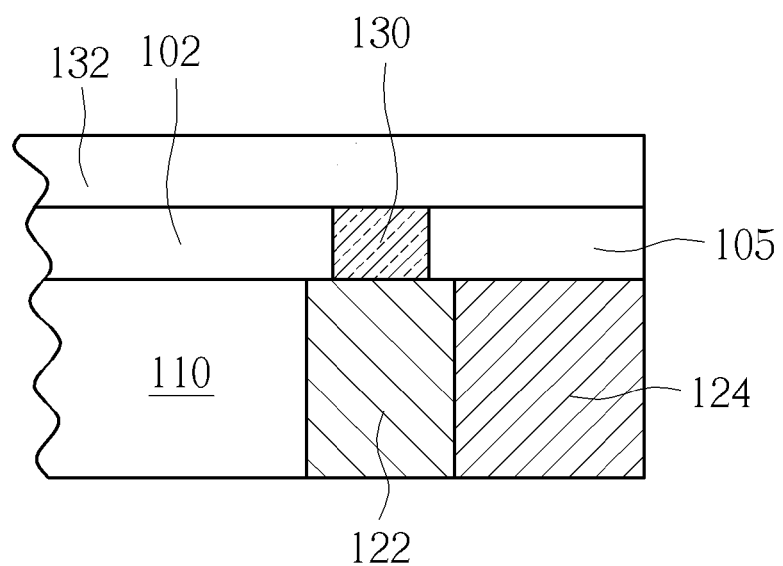

The glue layer 130 is optional. For example, in FIG. 12A, the covering insulation layer 132 directly fills into the gap 125. In FIG. 12B, the gap 125 is filled with the sealant layer 122 that is extruded when assembling the battery cell. In FIG. 12C, the glue layer 130 may protrude from an upper end of the gap 125 and covers a portion of the outer conductive frame 105 and a portion of the positive current collecting substrate 102. In FIG. 12D, the glue layer 130 is covered by the covering insulation layer 132.

According to one embodiment of the present disclosure, the lithium-ion battery 100 may have a thickness T ranging between 0.25 mm and 0.5 mm, but not limited thereto. In some cases that the battery 100 comprises folded cells, thickness may reach 2 mm.

The sealant layer 122, in combination with the conductor layer 124, satisfactorily protects the laminated electric core 110 from exposure to air or moisture. The disclosed structure provides high moisture-proof capability and insulating property.

FIGS. 6A-6D show some variations of the moisture-proof and air-proof packaging structure according to some embodiments of the invention.

Figure 6A:
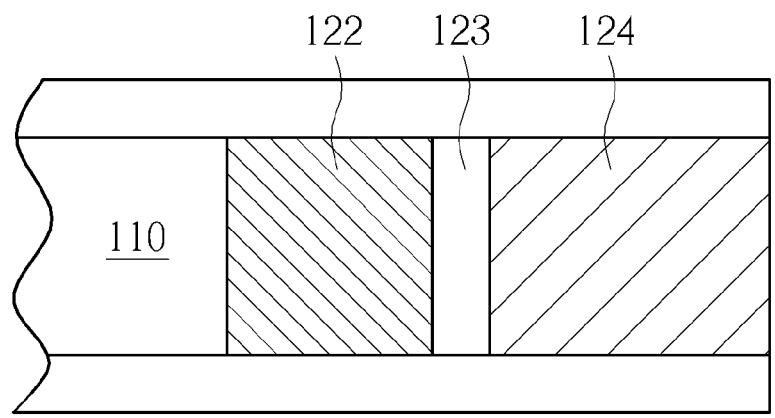
FIGS. 6A-6D show some variations of the moisture-proof and air-proof packaging structure according to some embodiments of the invention.

As shown in FIG. 6A, an air gap 123 may be provided between the sealant layer 122 and the outer, peripheral conductor layer 124. The air gap 123 may be vacuumed in one embodiment. According to another embodiment, dry air or dry inert gas may be filled into the air gap 123.

Figure 6B:
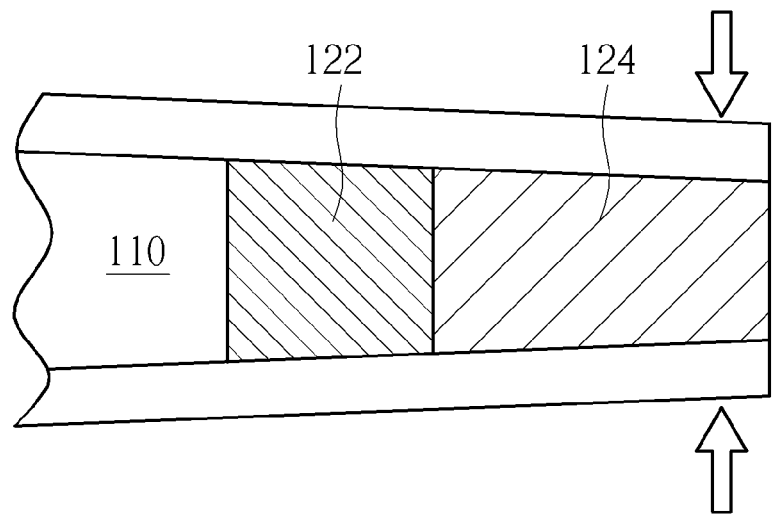

Alternatively, as shown in FIG. 6B, the peripheral ends of the current collecting substrates may be pressed together or pressed toward each other to form a tapered cross-sectional profile of the periphery of the battery cell. In this case, both of the sealant layer 122 and the conductor layer 124 have a trapezoid shaped cross section.

Figure 6C:
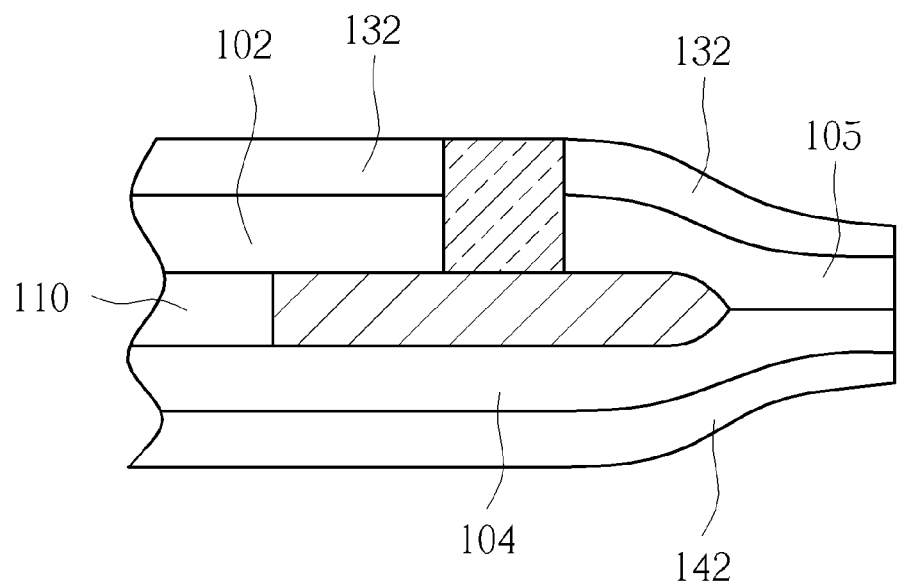

In FIG. 6C, the conductor layer 124 is omitted. The outer conductive frame 105 and the negative current collecting substrate 104 are welded together.

Figure 6D:
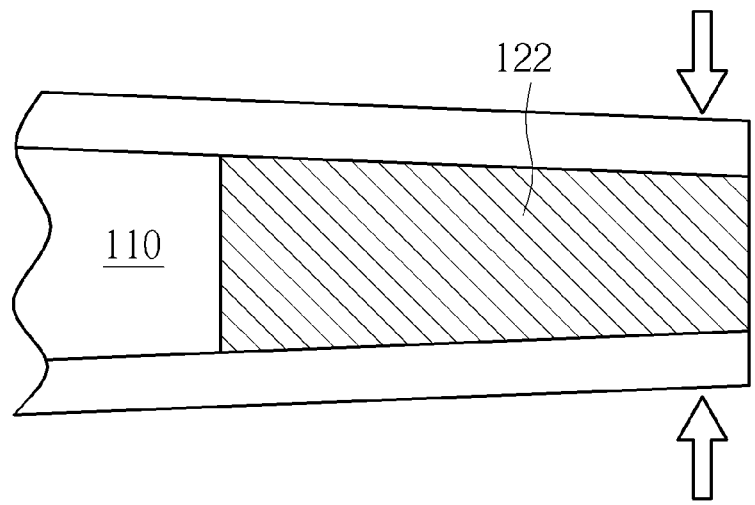

In FIG. 6D, the conductor layer 124 is omitted. Only the seal layer 122 is used to seal the periphery of the electric core 110. The peripheral ends of the current collecting substrates may be pressed together or pressed toward each other to form a tapered cross-sectional profile of the periphery of the battery cell. In this case, the sealant layer 122 has a trapezoid shaped cross section.

The positive current collecting substrate 102 may be any one well known in the art such as an aluminum foil. The positive electrode active material layer 111 may comprise a positive electrode active substance and an adhesive, in which the positive electrode active substance may be any one known in the art for the lithium ion battery. According to some embodiments of the present disclosure, the positive electrode active substance may comprise $LiCoO_2$, $LiFePO_4$, $LiMn_2O_4$, or any suitable three-component substances known in the art. The adhesive may be any one well known in the art such as polyvinylidene fluoride (PVDF). According to some embodiments of the present disclosure, the positive electrode active material layer may also comprise positive electrode additives. The positive electrode additive may be any one well known in the art and may be selected from conductive agents, for example, at least one of acetylene black, conductive carbon black and conductive graphite.

The negative current collecting substrate 104 may be any one well known in the art such as copper foil. The negative electrode active material layer 113 may comprise a negative electrode active substance and an adhesive. The negative electrode active substance may be any one commonly used in lithium ion batteries, such as natural graphite and artificial graphite. The adhesive may be any one well known in the art such as polyvinylidene fluoride (PVDF) and polyvinyl alcohol.

The electrolyte may comprise a lithium salt electrolyte and solvent. In some cases, gel-type or solid state electrolytes may be used. The lithium salt electrolyte may be at least one selected from lithium hexafluorophosphate ($LiPF_6$), lithium perchlorate ($LiClO_4$), lithium tetrafluoroborate ($LiBF_4$), lithium hexafluoroarsenate ($LiAsF_6$), lithium halide, lithium aluminum tetrachloride and lithium fluoroalkyl sulfonate. The solvent may comprise an organic solvent, such as a mixture of chain-like acid esters or cyclic acid esters. The chain-like acid ester may comprise at least one selected from dimethyl carbonate (DMC), diethyl carbonate (DEC), ethyl methyl carbonate (EMC), methyl propyl carbonate (MPC), dipropyl carbonate (DPC) and other fluorine-containing, sulfur-containing or unsaturated bond-containing chain-like organic esters. Alternatively, a solid state electrolyte such as lithium phosphorus oxynitride (also known as LiPON) may be used.

The separator 112 is electrically insulated and also has good electrolyte retaining performance. According to some embodiments of the present disclosure, the separator may be any kind of separators used in lithium-ion batteries known in the art, such as polyolefin micro-porous membrane, polyethylene felt, glass fiber felt or ultrafine glass fiber paper. Alternatively, an adhesive resin layer (not shown) may be provided to bond the positive electrode active material layer 111 or negative electrode active material layer 113 to the separator 112. The adhesive resin layer may have a large number of through holes that communicate the positive electrode active material layer 111 or negative electrode active material layer 113 with the separator 112. The adhesive resin layer may create an intimate interfacial contact between adjacent layers.

Figure 7:
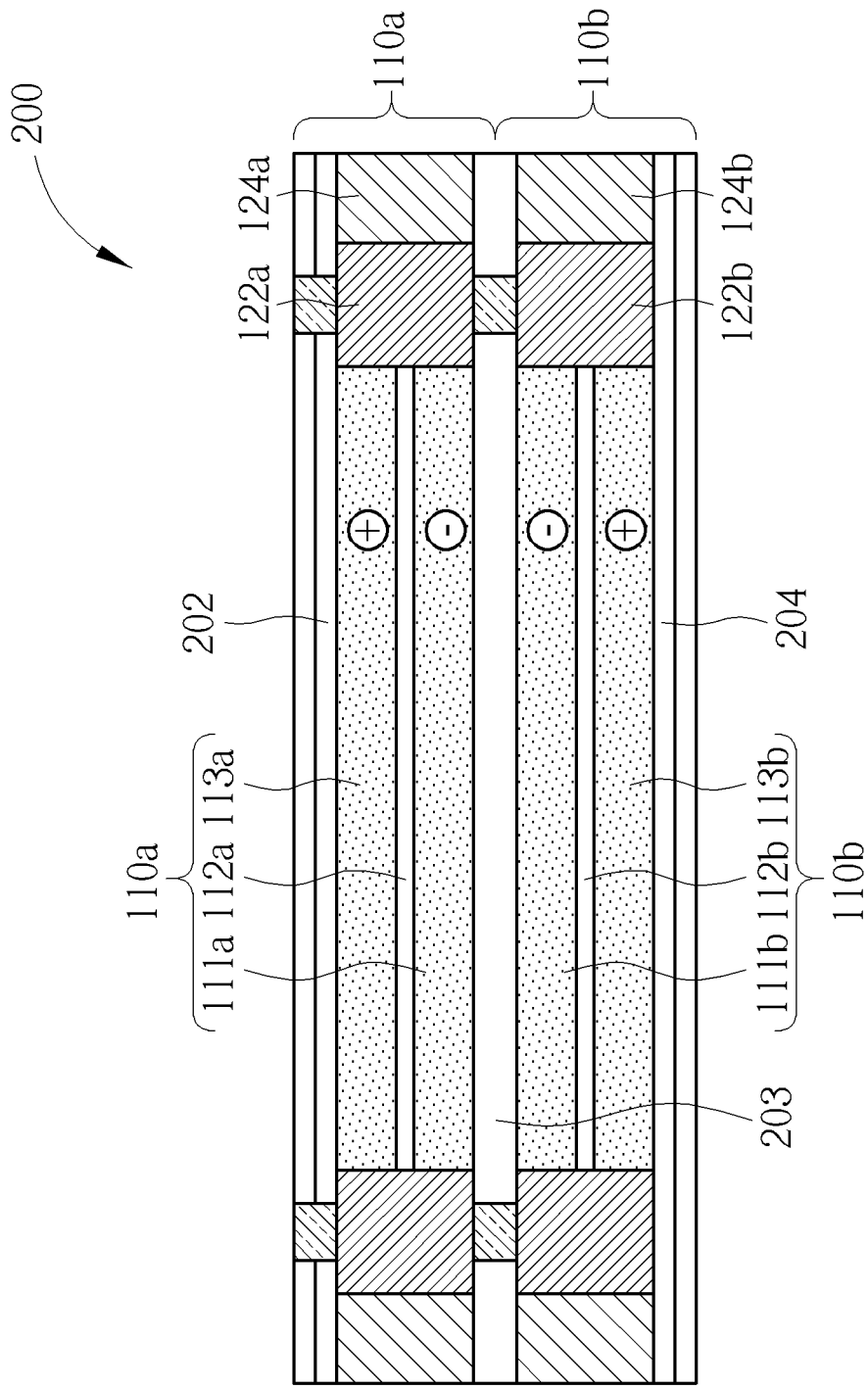
FIG. 7 is a schematic, cross-sectional diagram illustrating a stack structure of a thin-film lithium-ion battery according to another embodiment of the invention.

FIG. 7 is a schematic, cross-sectional diagram illustrating a stack structure of a thin-film lithium-ion battery according to another embodiment of the invention. The stack structure of a thin-film lithium-ion battery may be composed of several secondary cells as described above in parallel to increase the discharge current capability, and may be available in series packs to increase the total available voltage.

As shown in FIG. 7, the stacked thin-film lithium-ion battery 200 may comprise at least two lithium-ion battery units 100a and 100b, each of which has a structure that is similar to FIG. 4. For example, the upper lithium-ion battery unit 100a comprises a laminated electric core 110a comprising a positive electrode active material layer 111a coated on a first surface of an intermediate current collecting substrate 203, a separator 112a sandwiched between the positive electrode active material layer 111a, and a negative electrode active material layer 113a. On the second surface of the intermediate current collecting substrate 203 is the laminated electric core 110b of the lower lithium-ion battery unit 100b. The laminated electric core 110b comprises a positive electrode active material layer 111b coated on the second surface of an intermediate current collecting substrate 203, a separator 112b sandwiched between the positive electrode active material layer 111b, and a negative electrode active material layer 113b. The laminated electric core 110a and the laminated electric core 110b are sandwiched between an upper current collecting substrate 202 and a lower current collecting substrate 204. Likewise, sealant layers 122a, 122b and outer packaging layers 124a, 124b may be employed to provide high moisture-proof capability and insulating property.

Figure 13A:
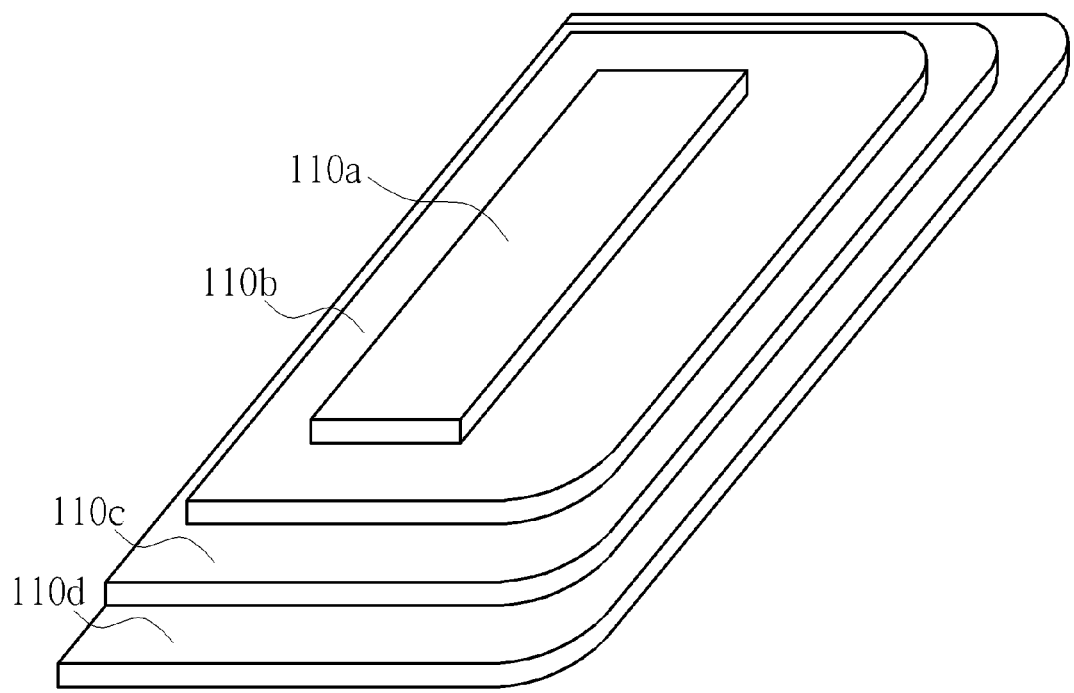
FIG. 13A and FIG. 13B show a non-rectangular, terraced battery structure.
Figure 13B:
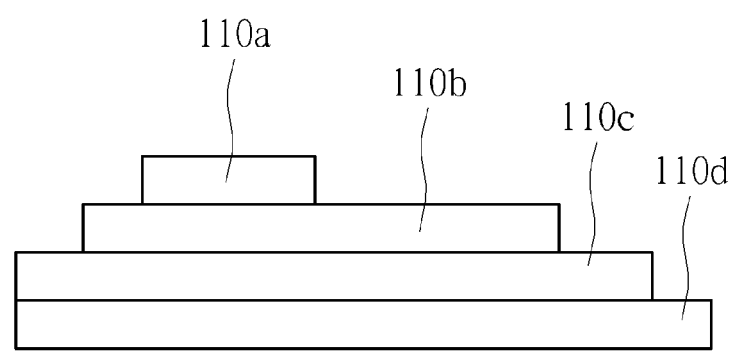

The layers in the stack structure as described in FIG. 7 may have different dimensions according to another embodiment of the invention. As shown in FIG. 13A and FIG. 13B, the topmost layer 110a has a dimension that is smaller than the underlying layer 110b, which is smaller than the layer 110c, which is smaller than the layer 110d. The layer stack forms a non-rectangular or an irregular shape, terraced structure and may have a rounder corner. By providing such non-rectangular configuration of the battery, the free space within a portable electronic device can be efficiently utilized.

Figure 14A:
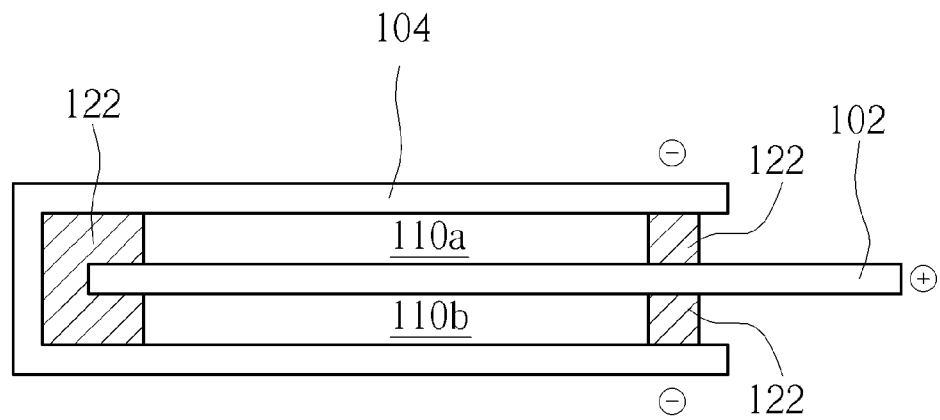
FIGS. 14A and 14B show multi-cell batteries according to other embodiments.
Figure 14B:
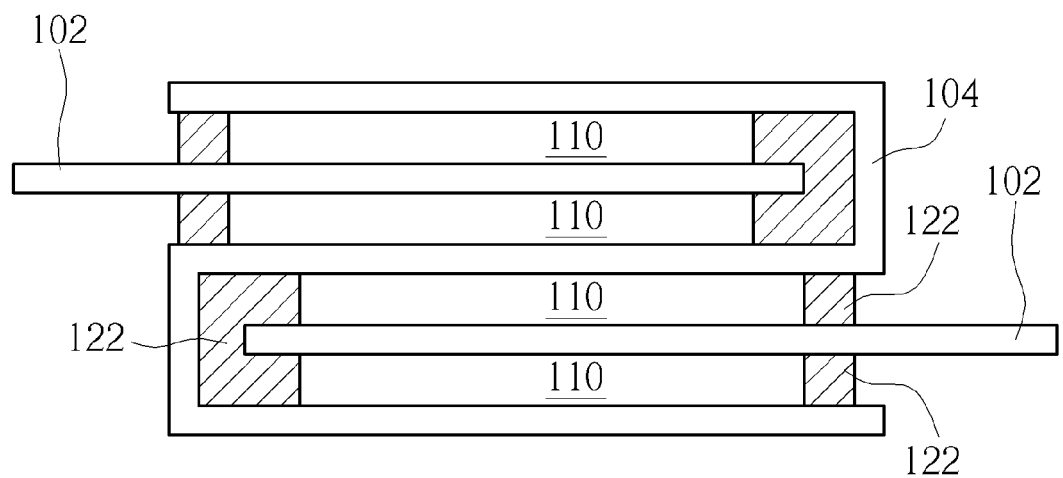

FIG. 14A shows a two-cell battery according to yet another embodiment. As shown in FIG. 14A, the two cells including two laminated electric cores 110a and 110b may be arranged in parallel to each other on the negative current collecting substrate 104 and then folded to sandwich about the positive current collecting substrate 102. The battery is then sealed by using sealant layers 122. The two cells in FIG. 14A are electrically coupled in parallel. FIG. 14B shows a four-cell battery according to yet another embodiment. As shown in FIG. 14B, the negative current collecting substrate 104 and the four cells including four laminated electric cores 110 are folded in a zigzag manner. The four cells in FIG. 14B are electrically coupled in parallel.

Figure 15:
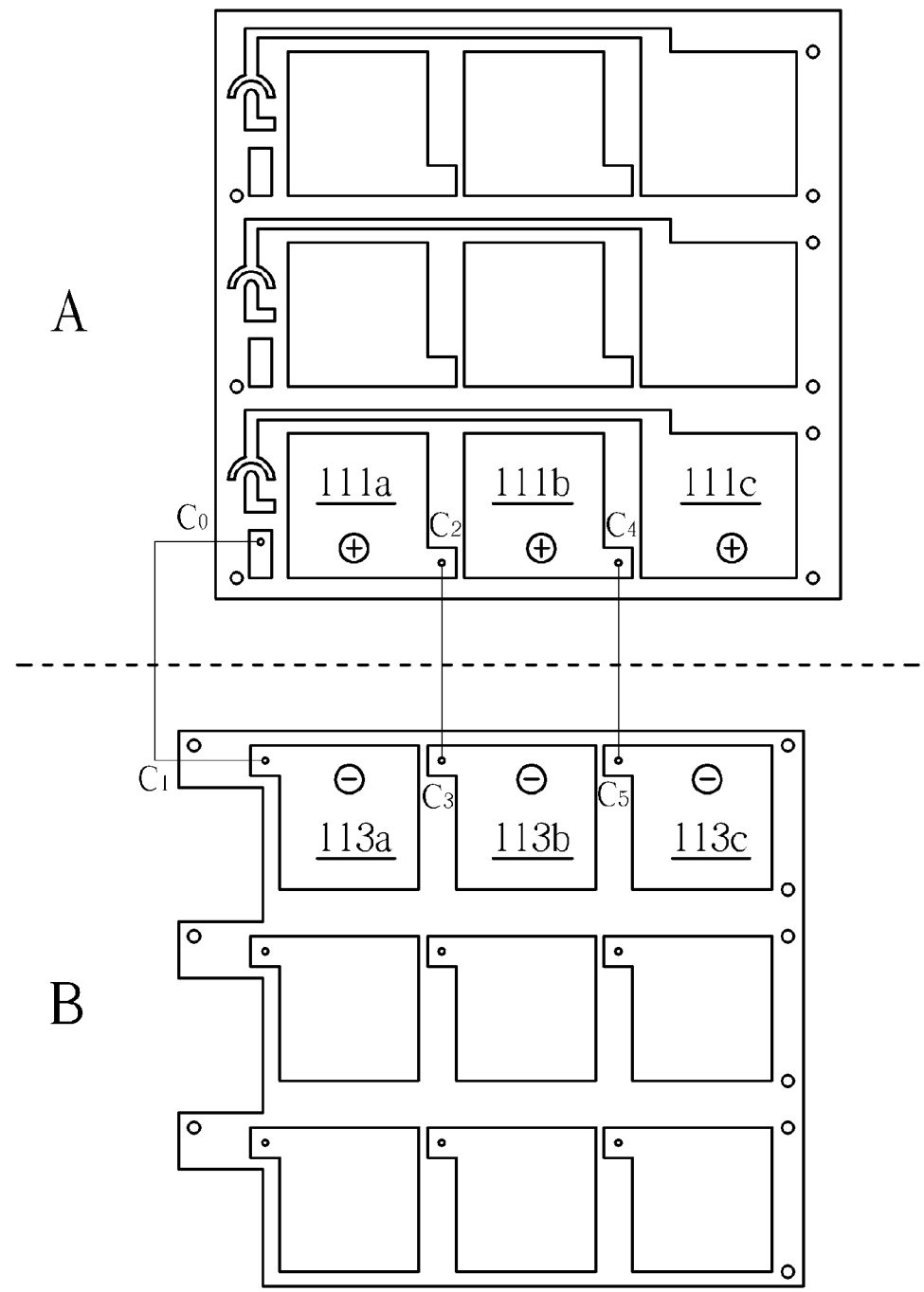
FIG. 15 illustrates the manufacturing steps for a three-cell in series battery pack.

FIG. 15 illustrates the manufacturing steps for a three-cell battery pack. As shown in FIG. 15, an array of positive electrode active material layers 111 are formed on a panel A. An array of negative electrode active material layers 113 are formed on a panel B. On the panel A, respective electrical connection points C0, C2 and C4 are provided, which correspond to the electrical connection points C1, C3 and C5 on the panel B. The panel A is laminated onto the panel B to form a three-cell in series configuration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thin film lithium-ion battery unit, comprising:
a positive current collecting substrate;
a positive electrode active material layer coated on an inner surface of the positive current collecting substrate;
a negative current collecting substrate;
a negative electrode active material layer coated on an inner surface of the negative current collecting substrate;
a separator sandwiched between the positive electrode active material layer and the negative electrode active material layer;
an electrolyte retained at least in the separator, wherein the positive electrode active material layer, the separator and the negative electrode active material layer constitute a laminated electric core;
an outer conductive frame being spaced apart from the positive current collecting substrate and encompassing the positive current collecting substrate with a gap formed therebetween, wherein the outer conductive frame and the positive current collecting substrate are coplanar, and wherein the outer conductive frame encloses the positive current collecting substrate along perimeter of the positive current collecting substrate;
a glue layer disposed in the gap; and
a sealant layer disposed along a periphery of the laminated electric core between the positive current collecting substrate and the negative current collecting substrate so as to seal the laminated electric core, wherein the sealant layer is in direct contact with the laminated electric core, and wherein the glue layer is in direct contact with the sealant layer.

2. The thin film lithium-ion battery unit according to claim 1 wherein the outer conductive frame is an open-loop shaped frame and includes an opening for accommodating a positive tab that juts out from an edge of the positive current collecting substrate, wherein the positive tab is coplanar with the positive current collecting substrate.

3. The thin film lithium-ion battery unit according to claim 2 wherein the outer conductive frame includes a protruding negative tab, wherein the positive tab and the negative tab form a battery terminal pair, and wherein the protruding negative tab is coplanar with the positive tab.

4. The thin film lithium-ion battery unit according to claim 1, wherein the glue layer completely fills the gap, and wherein the glue layer is coplanar with the outer conductive frame.

5. The thin film lithium-ion battery unit according to claim 1 further comprising a conductor layer is disposed adjacent to the sealant layer to electrically couple the outer conductive frame to the negative current collecting substrate.

6. The thin film lithium-ion battery unit according to claim 5 wherein the conductor layer is in direct contact with the sealant layer.

7. The thin film lithium-ion battery unit according to claim 1 wherein the thin film lithium-ion battery unit has a rectangular shaped outline.

8. The thin film lithium-ion battery unit according to claim 1 further comprising a covering insulation layer that covers the outer conductive frame and the positive current collecting substrate.

\* \* \* \* \*